United States Patent Office 2,793,998
Patented May 28, 1957

2,793,998

COMPOSITION FOR HYDRAULICALLY FRACTURING FORMATIONS

Harold W. Brainerd, Jr., Overland Park, Kans., Harold W. Gray, Jr., Odessa, Tex., and Paul L. Menaul, Tulsa, Okla., assignors to Pan American Petroleum Corporation, a corporation of Delaware No Drawing. Application February 28, 1956,
Serial No. 568,165

8 Claims. (Cl. 252—8.55)

This invention pertains to an improved composition of matter. More specifically, this invention pertains to a temporary oil-in-water emulsion which is particularly adapted to be used as a fracturing fluid in the Hydrafrac process. This is a continuation-in-part of our U. S. application Serial Number 344,242, filed March 23, 1953, now abandoned.

The Hydrafrac process, as disclosed in Re. 23,733, Farris, is a process for producing fractures in a subterranean formation by the application of a high hydraulic pressure within a well at the elevation of the formation which is to be fractured. It has been found highly desirable that the fracturing liquid have a high initial viscosity and low filtrate rate, and that eventually the viscosity be broken back or decreased preferably to a viscosity within the range of the well fluids. The viscosity of the fracturing fluid is typically in the range of 1,000–5,000 centipoises or greater. With fluid of this viscosity, a granular propping agent is carried by the fluid into the fracture, and additionally the filtration of the fracturing liquid into the formation is sufficiently retarded so that a high pressure can be applied to the formation by injecting the fracturing fluid into the well at a reasonable pumping rate. It is also generally considered highly desirable that the fracturing liquid should not contaminate the fractured formations with a fluid which might produce a fluid block therein or a decrease in formation permeability. That is, in wells producing oil, particularly where the oil is produced from a preferentially water-wet formation, contamination of the formation with water is considered undesirable. Furthermore, in many limestone and sandstone formations substantial quantities of hydrophilic colloids have been found which, if contacted with a relatively fresh water, tend to swell, thereby decreasing the formation permeability. The deleterious effect of these contaminants often overcomes the advantages obtained through the increasing of permeability by the Hydrafrac process. Hydrocarbon gels including particularly hydrocarbons gelled with various oil-soluble soaps have generally been used to produce fractures in oil-producing formations. The cost of producing such gels is very high, particularly in cold climates, since the gels can be produced quickly and efficiently only at temperatures above about 70° F.

It is an object of this invention to provide an improved and relatively cheap fracturing liquid which is initially very viscous and which automatically reduces to a highly fluid state after a formation fracture has been produced. It is a more specific object of this invention to provide a viscous oil-in-acid emulsion containing a very minor amount of water, the emulsion being produced readily at any temperature with an ester which is hydrolyzed by the acid in the emulsion whereby the emulsion is broken and the extraneous liquids can be removed from the formation as the well is produced. These and other objects of this invention will become apparent from the following detailed description.

Our improved composition of matter comprises in brief a major proportion of a light hydrocarbon liquid emulsified in a very minor proportion of an acid solution with a water-soluble nonionic surface active agent of the ester type. With this emulsifying agent the concentration of the hydrophilic constituent of the emulsion may be so small that the contamination and reduction of permeability in the formation is substantially negligible. The water phase, however, contains sufficient acid to hydrolyze the emulsifier so that after a suitable time delay which permits the fracturing liquid to be injected into a formation, the film of surface active agent between the hydrophilic and lipophilic components is destroyed, and the emulsion is thereby broken, allowing the oil droplets to agglomerate whereby the liquid components of the emulsion can be removed from the pores of the formation with the connate liquids.

The hydrocarbon or oily component of the emulsion fracturing fluid is typically a hydrocarbon in the boiling range of gasoline, kerosene, naphtha, light fuel oil, light crude oil, and the like, and mixtures of these hydrocarbons. Heavier hydrocarbons can, of course, be used. For example, viscous oils in the motor oil range and heavy crude oil produce satisfactory emulsions, but, due to their greater viscosity, the removal of such viscous oils from a formation after a fracture is produced is somewhat more difficult than the removal of these lighter hydrocarbons. That is, since the liquids in the emulsion return to their initial viscosities after the emulsion is broken, it is considered desirable, but not necessary, that the liquid components of the emulsion composition have an initial viscosity in the lighter hydrocarbon range, typically in the range of about 1–10 centipoises. Crude oils are less desirable than refined oils due to the fact that many crude oils contain naturally an emulsifying agent which may tend to stabilize the emulsion. Kerosene is the preferred light hydrocarbon in view of its wide availability, its relatively uniform composition, etc.

This light hydrocarbon is emulsified with an acid solution. Any acid which will hydrolyze an ester-type emulsifying agent is considered satisfactory. For example, hydrochloric, hydrofluoric, or other strong mineral acids which may be injected into a formation in solutions which are immiscible with the hydrocarbon phase, or an organic acid such as acetic acid may be employed. Hydrochloric acid is preferred. These acids are typically used in water solutions. The concentration of the acid may be varied over a substantial range. Since the function of the acid per se is largely to hydrolyze the emulsifying agent within a reasonable time, the concentration of the acid may be adjusted by experimentation so that the emulsion will be broken in the desired time, say within 24 hours. In the preferred embodiment using a hydrochloric acid solution, the concentration of the acid in the water solution is normally between about 5 and about 25 percent. A 15 percent hydrochloric acid solution, in view of its wide use in producing operations, is usually employed in shallow wells. The following Table I shows the effect of acid concentration and temperature on the breakdown time of the emulsion. Breakdown time is the time required for 75 percent of the hydrocarbon to separate from the emulsion in a beaker.

Table I

| Emulsifier Tween 20, ml. | Acid Volume, ml. | Acid Strength, Percent HCl | Kerosene Volume, ml. | Temperature, °F. | Breakdown Time, Hours |
| --- | --- | --- | --- | --- | --- |
| 2 | 100 | 15 | 900 | 80 | 12 |
| 2 | 100 | 15 | 900 | 120 | 4 |
| 2 | 100 | 7½ | 900 | 120 | 8 |
| 2 | 100 | 7½ | 900 | 140 | 5 |
| 2 | 100 | 5 | 900 | 140 | 6 |
| 2 | 100 | 5 | 900 | 160 | 2½ |
| 2 | 100 | 3 | 900 | 180 | 2 |
| 2 | 100 | 2 | 900 | 200 | 2 |

The amount of the acid solution or water phase, as indicated above, is preferably maintained at a minimum since many formations are contaminated and the permeability is decreased by the presence of the acid solution and/or its derivatives. For this reason, between only about 2 and about 15 percent of the acid solution based on the volume of hydrocarbon is normally used. The acid solution is preferably between about 5 and 10 percent of the volume of the hydrocarbon.

The light hydrocarbon is emulsified with the immiscible aqueous phase by use of a water-soluble nonionic surface active agent comprising a polyoxyethylene anhydrosorbitol monolaurate containing at least 12 ethylene oxide groups per molecule. A surface active agent of this type, known as Tween 20, is manufactured by Atlas Powder Company of Wilmington, Delaware. This surface active agent is produced by first dehydrating a sorbitol to produce a hexitan. The hexitan is then esterified with lauric acid to form the monolaurate which is treated with ethylene oxide to add polyoxyethylene chains to the non-esterified hydroxyls. Sufficient ethylene oxide groups are added to the non-esterified hydroxyls to make the surfactant highly water soluble. Between about 12 and about 25 ethylene oxide groups per molecule may be employed. About 20 ethylene oxide groups are preferred. This surfactant is highly soluble in highly ionized solutions such as strong acid solutions and is not soluble in the hydrocarbon phase. Being highly water soluble and oil insoluble, the amount of this surfactant used depends generally upon the amount of acid solution used. Between about 1 percent and about 10 percent of surfactant based upon the volume of the aqueous phase or acid solution is normally used. About 2 percent by volume is preferred.

The emulsion is produced by first dissolving or dispersing the surface active agent in the aqueous phase. A small amount of hydrocarbon is then added to this aqueous phase by rapid stirring or agitation to produce a primary emulsion. Typically about equal volumes of hydrocarbon phase and aqueous phase are first emulsified to produce the primary emulsion. After a primary emulsion is produced, the remainder of the hydrocarbon phase is added by the batch method as by adding the remainder of the oil to the pump suction as the primary emulsion is circulated until all of the oil and aqueous phases are emulsified or by the continuous method by adding the remainder of the oil to the pump suction, preferably a centrifugal pump, as the "secondary" emulsion or fracturing fluid is injected into the well. The viscosity of this emulsion depends somewhat upon the method of mixing, the temperature, the viscosity of the hydrocarbon phase, and the like, but in general the viscosity is typically in the range of 1,000–5,000 centipoises or greater as measured on the Gardner Mobilometer. The viscosity of the resulting emulsion may also be varied by varying the ratio of the aqueous and nonaqueous phases, the viscosity of the nonaqueous phase, or by varying the concentration of the surfactant. Laboratory or pilot runs are sometimes made to adjust the viscosity and breakdown rate as desired.

While the filtrate rate of the above-described emulsion is acceptable and the viscosity is sufficient to support propping agents such as 40–60 mesh U. S. sieve sand which is normally added before the fracturing liquid is injected into the well, its filtrate rate or filter loss to the formation may be improved by the addition of finely divided solids. Various solids such as the gums, e. g., locust bean gum, karaya gum or preferably batu gum, ground to pass through a 100 mesh sieve can be dispersed separately or together with the propping agent in the fracturing liquid before that liquid is injected into the well. Any amount of the solids may be added so long as the concentration is maintained low enough to permit the fracturing liquid to be pumped. Typically between about 1 and about 7 pounds each of sand and of gum are added per barrel of fracturing liquid. About 2 pounds of each are preferred.

As an example of the characteristics of a typical fracturing fluid of the type above described, 100 parts by weight of kerosene were emulsified in 5 parts of 10 percent hydrochloric acid solution using 1 part of water-soluble nonionic polyoxyethylene anhydrosorbitol monolaurate (Tween 20). This emulsion was then pumped through a 1-inch diameter pipe nipple containing a 6-inch section of 40 mesh Ottawa sand in a simulated 6,000 foot well test at 140° F. The viscosity of the emulsion both before passing it through the sand and subsequently was greater than about 5,000 centipoises, this viscosity being measured by comparison with the viscosity of hydrocarbon soap gels in a falling-ball consistometer. Thus where an emulsion is generally broken by intimate contact with a sand bed, the water-soluble polyoxyethylene anhydrosorbitol monolaurate by comparison produced an emulsion with a high oil-to-water ratio which, as indicated, passed through the sand bed without being materially affected. Due to the hydrolysis of the emulsifying agent by the weak acid solution, the emulsion was substantially completely broken within about two hours and the viscosity was reduced to substantially the viscosity of the oil (less than 10 centipoises). Within less than a day the aqueous and hydrocarbon phases had completely separated and the viscosity of each component was, of course, reduced to its initial viscosity.

From the foregoing, which is given by way of example, it can be seen that our improved composition is particularly adapted to be used in the Hydrafrac process. It is, however, susceptible of a wide variety of uses where temporary oil-in-water emulsion gels are desired. Accordingly, this invention should be construed to be limited only by the scope of the appended claims.

We claim:

1. An oil-in-water type emulsion comprising a minor proportion of a strong mineral acid, a major proportion of a light hydrocarbon and a water-soluble nonionic surface active agent having an ester linkage hydrolyzable by the action of said acid to break said emulsion.

2. A viscous fluid for fracturing a formation comprising a major proportion of a light hydrocarbon emulsified as the disperse phase in a minor proportion of an acid solution, and a water-soluble nonionic surface active agent having an ester linkage hydrolyzable by the action of said acid solution to reduce the viscosity of said fluid after a time sufficient to permit said fluid to be withdrawn from said formation.

3. A viscous fluid for fracturing a formation comprising a light hydrocarbon emulsified as a disperse phase in a quantity of a strong mineral acid solution, said quantity comprising between about 2 and about 10 per cent by volume of said light hydrocarbon, and a water-soluble nonionic surface active agent having an ester linkage hydrolyzable by the action of said acid to reduce the viscosity of said fluid after a time sufficient to permit said viscous fluid to be injected into said formation.

4. A viscous fluid for fracturing formations comprising a quantity of a light hydrocarbon emulsified as the disperse phase in a quantity of a water solution of a strong mineral acid, said solution being between about 2 and about 15 per cent by volume of said light hydrocarbon and the concentration of said acid being between about 5 and about 25 percent in said water solution, and a quantity of a water-soluble nonionic surface active agent having an ester linkage hydrolyzable by the action of said acid to reduce the viscosity of said fluid after a time sufficient to permit said viscous fluid to be injected into said formation.

5. A viscous fluid in accordance with claim 4 wherein said quantity of water-soluble nonionic surface active agent is between about 1 percent and about 10 percent of the volume of said water solution of a strong mineral acid.

6. A viscous fluid for fracturing a formation comprising by volume 100 parts of a light hydrocarbon emulsified as the disperse phase in about 5 parts of a 10 percent hydrochloric acid solution, said emulsion being produced and stabilized by a water-soluble nonionic anhydrosorbitol monolaurate having between about 12 and about 25 ethylene oxide groups per molecule.

7. A viscous fluid in accordance with claim 6 in which said water-soluble nonionic anhydrosorbitol monolaurate has about 20 ethylene oxide groups per molecule.

8. A viscous fluid in accordance with claim 7 in which the quantity of said monolaurate is between about 1 and about 10 percent of the volume of said acid solution.

References Cited in the file of this patent
UNITED STATES PATENTS

| | | |
|---|---|---|
| 2,356,205 | Blair et al. | Aug. 22, 1944 |
| 2,356,254 | Lehmann et al. | Aug. 22, 1944 |
| 2,742,426 | Brainerd | Apr. 17, 1956 |